United States Patent [19]
Matsumoto et al.
[11] 3,963,420
[45] June 15, 1976

[54] METHOD AND APPARATUS FOR AUTOMATICALLY DISSOLVING SAMPLES FOR ANAYLSIS

[75] Inventors: Ryutaro Matsumoto, Tokyo; Akihiro Ono, Yokohama; Isamu Taguchi, Tokyo, all of Japan

[73] Assignee: Nippon Steel Corporation, Tokyo, Japan

[22] Filed: Aug. 30, 1973

[21] Appl. No.: 393,184

[30] Foreign Application Priority Data

| | | |
|---|---|---|
| Aug. 31, 1972 | Japan | 47-86593 |
| May 28, 1973 | Japan | 48-59525 |
| May 28, 1973 | Japan | 48-59526 |

[52] U.S. Cl. .......... 23/230 R; 23/253 R; 23/259; 23/267 R; 23/272.6 S
[51] Int. Cl.[2] .......... B01F 1/00; G01N 31/00
[58] Field of Search .......... 23/230 R, 253 R, 259, 23/267 R, 272.6 S; 73/421 R, 421 US, 421 B

[56] References Cited

UNITED STATES PATENTS

| | | | |
|---|---|---|---|
| 2,192,140 | 2/1940 | McCreary | 23/259 |
| 2,434,723 | 1/1948 | Shook | 23/259 X |
| 3,034,868 | 5/1962 | Erickson | 23/267 R |
| 3,403,980 | 10/1968 | Litterio | 23/259 X |
| 3,419,358 | 12/1968 | Smythe et al. | 23/253 R X |
| 3,487,695 | 1/1970 | Haunschild et al. | 73/421 B |
| 3,625,398 | 12/1971 | Tometsko | 23/259 X |
| 3,669,629 | 6/1972 | Paramonov | 23/259 |
| 3,791,221 | 2/1974 | Kirschner et al. | 23/253 R X |
| 3,797,999 | 3/1974 | Witz et al. | 23/230 R |

*Primary Examiner*—Joseph Scovronek
*Attorney, Agent, or Firm*—Toren, McGeady and Stanger

[57] ABSTRACT

A method for automatically dissolving solid analysis samples in powder form which comprises transferring the sample from an external source into a dissolving tank under reduced pressure, adding a predetermined amount of dissolving solution, and taking out the solution. A condenser is provided at the top of the dissolving tank to effect condensation of vapor rising therefrom and the reduced pressure for transferring the sample is applied by vacuum means through the condenser.

8 Claims, 3 Drawing Figures

METHOD AND APPARATUS FOR AUTOMATICALLY DISSOLVING SAMPLES FOR ANAYLSIS

Figure 1:
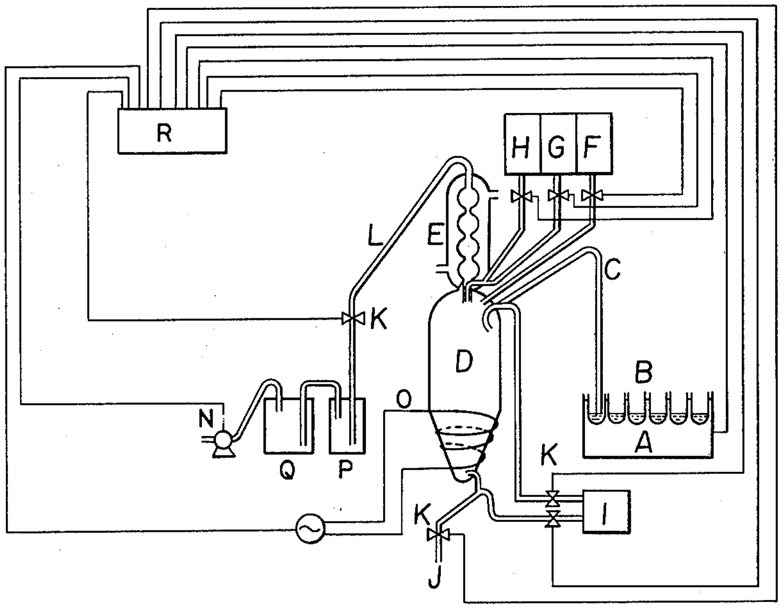

The present invention provides a simple and practical process and apparatus which enables to automatically dissolve solid samples for wet chemical analysis that have hitherto been made by a manual operation.

As is well known, the procedure of wet chemical analysis of solid samples consists of 1. Weighing of samples
2. Dissolution of samples, and
3. Quantitative determination (such as spectrophotometric analysis, atomic absorption analysis and volumetric analysis).

Namely, dissolution of samples is commonly essential for any chemical analysis whatever determination process may follow.

Recently, a great progress has been made with analytical methods of solid samples which do not involve dissolving the samples using instruments for analysis such as emission spectroscopic analysis and fluorescent X-ray analysis. Though they are extensively utilized for analysis, the wet methods for chemical analyses are still widely used. In iron and steel industries, for example, those who are engaged in instrumental analysis are less in number than those in wet chemical analysis. However, since wet chemical analysis is troublesome, tedious and requires experience, the present invention provides a series of investigations to automate the processes and simplify the procedures thereby eliminating the need for proficient personnel. The automated apparatus is also useful for various types of analyses such as spectrophotometric analysis, atomic absorption analysis and volumetric analysis. The present inventors have found a process and an apparatus for automatically dissolving solid samples in connection with coupling them with automatic analyzers such as above.

Today, there is found no automated apparatus for dissolving samples for wet chemical analysis. This is primarily because wet chemical analyses have not been developed to such an extent required by automation and mostly because dissolving procedure hitherto applied to solid samples by a manual operation has not been as effective and quick as is possible. An automated process is a batch one in which samples contained in dissolving vessels such as beakers are transported on a belt conveyer whilst dissolving solution is added to each of the vessels and heated to dissolve the samples. In such a batch system, however, the condition under which the samples are dissolved can not be strictly specified and controlled for different samples. The apparatus itself may probably become large, hence expensive and difficult to handle because a number of dissolving vessels should be treated at a time. Further, when samples are dissolved in acid, a vapor containing much mist of acid may be produced and a large scale draft chamber is needed to remove the vapor. In practice the treatment should better be done in an independently constructed draft chamber, making the treatment troublesome. In considering these difficulties, the present inventors have investigated and developed a simple, inexpensive and practical apparatus for analysis which requires no proficiency to handle and thus come to provide the single dissolving tank method of this invention.

The present invention will be explained in detail using FIG. 1 for illustration. (A) is an automatic apparatus for exchanging samples, turn-table type, conveyer type or any other. Solid powdery samples, ordinarily less than about 0.5g, are contained in test tube type vessels (B) of about 2cm in diameter and about 3cm in height and exchanged as contained in the vessels successively and automatically.

(B) are the sample vessels mentioned above, and (C) is a sample transfer tube. Samples are transferred to the dissolving tank (D) by suction by vacuum produced with a vacuum pump (N) where consideration is taken to complete the transfer in a moment without leaving a trace of sample. Namely, a vacuum tank (Q) that is a pressure resistant bottle of about 3 liter capacity connected with the vacuum pump has a vacuum applied thereto with the electromagnetic cock (K) on an exhaust pipe (L) closed, and at the moment when the sample is to be transferred the electromagnetic cock (K) is suddenly opened to produced a reduced pressure in the transfer tube (C) by which a strong suction is produced in the sample vessels (B) and therefore the sample powders are transferred into the dissolving tank (D) at a stroke.

The middle part of the transfer tube (C) is a synthetic resin tube which is not broken or sharply bent when it is raised with an elevator equipped at the end of the tube or attached to the automatic sample exchanging apparatus.

The tip end of the transfer tube (C), which may become wet with the vapor or acid mist produced in the dissolving tank (D) and capture the samples to prevent free transfer of sample, is kept dry all the time by blowing air from an air pump (I) via the transfer tube (C) into the dissolving tank (D). As is shown in FIG. 1, the end of the transfer tube (C) in the dissolving tank (D) is directed slantly downward to the inner wall, so that sample powders make a spiral movement toward the bottom of the dissolving tank (D) without dispersing throughout the tank.

(D) is a dissolving tank made of quartz with a conical bottom as shown in FIG. 1, on which outer wall a Nichrome wire is wound directly to enable rapid heating. The relatively large capacity (about 1 liter) compared with the amount of the dissolving solution (less than about 50 ml) intends for the dissolving solution not to overflow the tank during dissolution of sample.

The middle top of the dissolving tank (D) is provided with a cooling condenser (E) as is seen in FIG. 1, which is cooled with water to return vapor and mist of the dissolving solution into the dissolving tank (D). Therefore, the solution volumes when added at first (containing water) and when taken out from the bottom part after the dissolution is completed are almost equal to each other, and thus the possible loss of solution due to forming vapor and acid mist is negligible in the practical sense. Practically this has twofold importance. First, there is no loss in the solution at the time of dissolution, or in other words the volume of solution to be taken out from the tank can be expected to calculate from the volume of solution added at first. This fact implies that the solution taken from the tank can be used directly for the purpose of analysis without being subjected to quantitative treatment such as making up to volume in a measuring flask. Second, a small amount of dissolving solution can be effectively utilized for dissolving samples because there exists no loss of the dissolving solution. This means to decrease the blank values and therefore good results can be expected when the process is applied to quantitative determination of trace elements.

Descriptions on exhaust pipe (L), vacuum pump (N), and vacuum tank (Q) have been already given. The washing bottle (P) is intended to trap off any acid mist that might pass the exhaust pipe (L) and enter the vacuum pump to corrode it.

There are openings at the upper part of the dissolving tank (D) for the apparatus for quantitative addition of water (F) and the apparatus for quantitative addition of dissolving solution (G) and (H). These are for adding at a certain time certain amounts of water (distilled water or deionized water prepared by ion exchanger for chemical analyses) and dissolving solution, respectively. Similar apparatus may be used for both water and dissolving solution. However, use of the small size apparatus for quantitative addition of solution invented by the present inventors is recommended, which employs a simple water level locator and is operated by the time-program controller. Water is added only when the dissolving reaction is too vigorous and to wash the inside.

Any dissolving solution hitherto used may be employed in this invention, depending on the nature of samples. Among them a mixture of concentrated hydrochloric acid and hydrogen peroxide (30% solution in water), that have been separately contained in the vessels and mixed together in the volume ratio of 1 : 1 in the dissolving tank (D) before the reaction, is especially effective and extensively used for various solid samples. Similarly effective is a mixture of concentrated hydrochloric and nitric acids in the volume ratio of 3 : 1 which is prepared and reacted with sample in the dissolving tank (D). As is well known, chlorine in the former and nitrosyl chloride in the latter both in the nascent state react rapidly and effectively with the samples to accelerate the dissolution reaction. In a manual operation, however, simultaneous addition of the two components and full use of the components in the nascent state are more difficult than in the automatic operation described above.

In the present invention, a series of operations, that is, addition of the dissolving solution, addition of water when the dissolving reaction proceeds too vigorously, heating to accelerate the same reaction, delivering and discarding the dissolving solution and washing the dissolution vessel are conducted automatically in accordance to signals from a controlling device. A hook-shaped quartz tube with the opening directed downward is provided at the bottom of the dissolving tank (D), which is connected with the air pump (I) and the solution outlet (J). The function of the opening is two-fold: one is to clear the whole solution from the tank when the dissolution is completed and the other is to blow air from the air pump (I) into the tank to operate agitation and to prevent bumping during the dissolution.

When the dissolution is completed, the solution is transferred via the hooked tubing to the outlet (J) rapidly and completely, then washing water is introduced into the dissolving tank (D) and discarded through the hooked tubing to clear the whole sample solution. An apparatus for analysis may be connected with the outlet (J) either directly or not, or otherwise the solution from the outlet (J) may be delivered to beakers or test tubes placed on an automatic vessel exchanger which is operated synchronously with the cycle of the main apparatus (5 minutes per cycle). The volume of solution delivered is considered to be calculated from the added amount of the dissolving solution, and this is favorable in the procedure that follows and to decide the working conditions involved in the process.

Every part of the apparatus described above may be automatically controlled by a control mechanism R. For this control, a pinboard type program timer or otherwise a suitable commercial program timer may be used practically. The control mechanism R, as shown in FIG. 1, is connected to each of the individual elements of the system which are to be controlled in order to effect the automatic operation of the apparatus.

EXAMPLE 1

Using the apparatus of the present invention, each 0.25g of chipped powders of various steel samples were automatically and successively dissolved in a mixture of concentrated hydrochloric acid and hydrogen peroxide (30% solution in water), the resulting solution was delivered to a beaker on an automatic vessel exchanger and analyzed for nickel by the atomic absorption analysis. These results were compared with the corresponding results obtained by the manual dissolving operation, to obtain the applicability of the automatic dissolving apparatus of this invention. A pin-board type program timer was used in which dissolution of one sample was completed in 5 minutes and the dissolving solution together with wash liquor were delivered to a beaker placed on an automatic vessel exchanger. Table 1 shows comparative analysis of nickel by the atomic absorption analysis where one was obtained by dissolving samples with the apparatus of this invention and the other by the manual operation. Steel samples appearing in Table 1 were from carbon steel, low alloy steel and stainless steel.

Table 1

Analysis of nickel by atomic absorption spectrophotometry using the apparatus of the present invention to dissolve sample (Sample weight : 0.25g)

| Steel sample | Analysis by this apparatus (%) | Analysis by manual operation (%) |
|---|---|---|
| Carbon steel | 0.02 | 0.02 |
| " | 0.05 | 0.05 |
| " | 0.03 | 0.03 |
| Low alloy steel | 0.05 | 0.05 |
| " | 2.97 | 2.97 |
| Stainless steel | 8.86 | 8.86 |
| " | 19.8 | 19.8 |

Dissolution of the 7 samples appearing in Table 1 was complete with the apparatus of this invention. As is seen in the table results obtained with the present apparatus agreed with those by manual operation, exhibiting that the said automatic dissolving apparatus was fully useful for practical purpose.

EXAMPLE 2

Using the apparatus of the present invention, each 0.25g of chipped powders of various steel samples were automatically and successively dissolved in a mixture of concentrated hydrochloric acid and hydrogen peroxide (30% solution in water), the resulting solution was delivered to an automatic absorption spectrophotometric apparatus that had been connected with the solution outlet, and the solution was analyzed for aluminum (more strictly, soluble aluminum in steels). Results obtained were compared with those obtained by manual operation. Each cycle took 5 minutes. For the automatic spectrophotometric analysis of aluminum, the automatic spectrophotometric apparatus of the present inventors (U.S. Ser. No. 283,851 of Aug. 25, 1972, now abandoned) and the eriochrome cyanine R method of analysis were used. More particularly, solutions used for the analysis were those of thioglycollic acid (3%), of eriochrome cyanine R (0.05%), of polycyclic ketoamine (320g of ammonium acetate and 20g of sodium sulfite were dissolved in water and made up to 1 liter and 3 ml of polycyclic ketoamine was added under stirring). One cycle time was 5 minutes for the automatic dissolving apparatus and 6 minutes for the automatic spectrophotometric apparatus, and therefore the two apparatus were combined so that the former dissolved the next sample while the latter analyzed a sample.

Table 2 comparatively shows the results of automatic spectrophotometric analyses of steel samples, where samples were dissolved in a same dissolving acid solution: one by automatic operation using the apparatus of this invention and the other by manual operation. Steel samples appearing in Table 2 were carbon steel, low alloy steel and stainless steel.

Table 2

Analysis of aluminum by automatic spectrophotometry using the present apparatus to dissolve sample (sample weight : 0.2g)

| Steel sample | Analysis by this apparatus (%) | Analysis by manual operation (%) |
|---|---|---|
| Carbon steel | 0.005 | 0.005 |
| " | 0.009 | 0.009 |
| " | 0.030 | 0.030 |
| Low alloy steel | 0.012 | 0.012 |
| " | 0.008 | 0.008 |
| Stainless steel | 0.031 | 0.031 |
| " | 0.008 | 0.008 |

Dissolution of the 7 samples appearing in Table 2 was complete with the apparatus of this invention. As is seen in Table 2 results obtained with the present apparatus agreed with those by manual operation, exhibiting that the said automatic dissolving apparatus was fully useful for the practical purpose.

EXAMPLE 3

Figure 2:
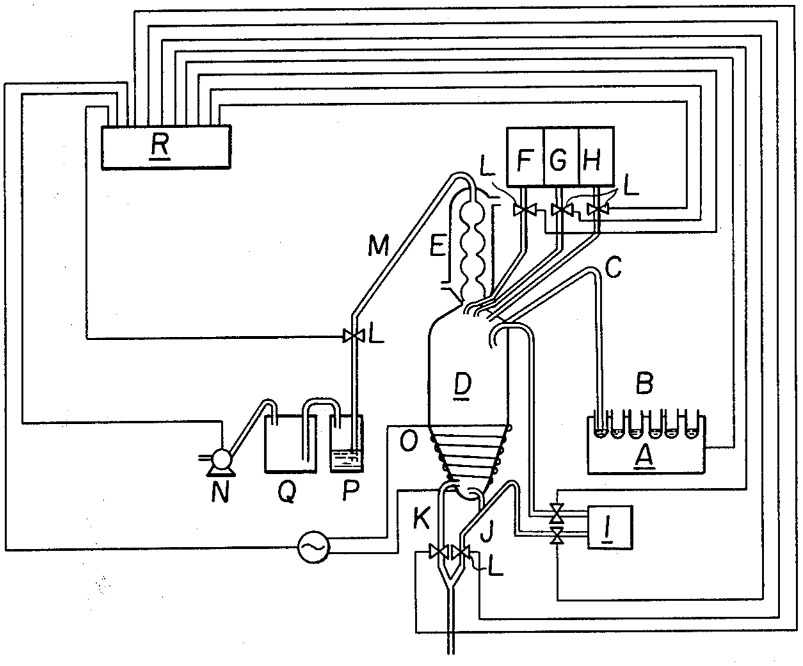

FIG. 2 illustrates a modification of the present invention, in which;

(A) is an automatic sample exchanging apparatus which automatically and successively exchanges sample vessels (B) containing solid powder samples, and the apparatus may adopt any type of exchanging, the turn table-type or the belt conveyer-type. Samples in the sample vessels (B) are transferred by vacuum suction (or reduced pressure) produced by the vacuum pump (N) at the end into the dissolving tank (D) via the sample transfer tube (C). In order to complete the transferring at a moment without leaving the samples in the vessels, vigorous suction by vacuum is utilized by making the vacuum tank (Q) (approximate capacity of 3 liters) to a reduced pressure beforehand with the vacuum pump and promptly opening the electromagnetic cock (L) on the exhaust tube (M). To prevent the tip end of the sample transfer tube (C) from getting with vapor or mist of acid produced in the dissolving tank (D) that may interfere with the complete transfer of samples, air is blown via the transfer tube (C) into the dissolving tank (D) to keep the dry state in the transfer tube. The dissolving tank (D), made of quartz, is capable of being rapidly heated by the Nichrome wire directly wound on the outside wall of the lower conical part. The Nichrome wire could be replaced by a Teflon coated heater placed inside the dissolving tank. A condenser (E) installed on the dissolving tank (D) serves to return mist and vapor of the dissolving solution into the tank, to keep the solution volume added equal to the volume when the dissolution is completed. This is very important in practice. Namely, the solution volume that is to be delivered to the next step could be obtained from the volume added and, since the volume is kept constant, no operation to adjust the solution volume is needed in the subsequent steps when an aliquot of the solution is to be taken for analysis. Further, since the solution is kept confined in the tank, a small amount of acid is sufficient to dissolved the samples, and this leads to reduce blank values remarkably so as to be favorable to analyse micro amount of elements.

The dissolving tank is provided at the bottom with a first outlet for solution (J) and a second outlet (K) as shown in the FIG. 2. For the reason mentioned above, solid samples are first dissolved for the most part in a certain amount of the dissolving solution under heating, the resultant solution is delivered through the second outlet (K), another certain amount of the dissolving solution is added to completely dissolve the remainder of the samples under heating, and the total amount of the solution is delivered through the first outlet (J). For this purpose, the outlet for solution first (J) is located at the lowermost part and the second outlet (K) at a higher part of the dissolving tank as shown in the figure. The first outlet for solution (J) is connected with the air pump (I) as shown in the figure to blow air into the tank aiming to prevent bumping and to agitate the solution under dissolution.

There are three inlets on the upper part of the dissolving tank (D), that is quantitative water supplier (F) and quantitative dissolving solution suppliers (G) and (H), which serve to supply at a predetermined time certain amounts of water and dissolving solutions, respectively.

As dissolving acid, any dissolving liquid hitherto known may be used depending on the nature of samples. Among them, however, concentrated hydrochloric acid and hydrogen peroxide (30% solution in water), separately placed in the containers (G) and (H) and mixed in the volume ratio 1 : 1 in the dissolving tank immediately before the reaction with the samples is extremely effective and can be applied to a wide variety of solid samples. Another example of mixed acids effectively used is a mixture of concentrated hydrochloric and nitric acids in a volume ratio of 3 : 1. As could be suspected the effective species are chlorine in the former and nitrosyl chloride in the latter, both in the nascent state, which immediately and directly react with the samples and accelerate the dissolution reactions. In manual operations, however, the nascent state of reactants which is realized by the simultaneous addition of reagents is more difficultly utilized in the dissolving reaction than in automatic operations as appears in the present invention. In the next place, the strong dissolving power which these dissolving solutions originally hold can not be expected to remain when most part of samples has been dissolved or heating has continued for a long period of time. To accelerate complete dissolution of samples in these cases, the process of the present invention, in which the solution that has formed is removed and a fresh dissolving solution is added to the remainder of the undissolved sample solid, is extremely effective.

The gas that is formed at dissolution of samples is transferred into the gas exhausting tube (L), washed in a wash bottle (P) and expelled with a vacuum pump outside the system.

The sample solutions prepared are delivered to the next step through the first and second outlets for solution and a certain amount of water is added to the tank to wash and clear the inside with bubbles of air blown and delivered through the first and second outlets and to the next step to add to the previous solution. An apparatus for analysis may be connected with the outlets for solution (J) and (K) either directly or not.

Every part of the apparatus described in detail is operated under control of a controlling device. In practice, however, a pin-board type sequence programmer can be used for the automated control.

The apparatus of the present invention was investigated with 0.25 g of chipped various steel samples and the powders were automatically and successively dissolved in a mixture of concentrated hydrochloric acid and hydrogen peroxide (30% solution in water) to examine the dissolution. In fact, 5 minutes were sufficient to completely dissolve a specimen. Thus, the automatic dissolving apparatus of the present invention considerably saved human power by dissolving samples rapidly and automatically.

EXAMPLE 4

Figure 3:
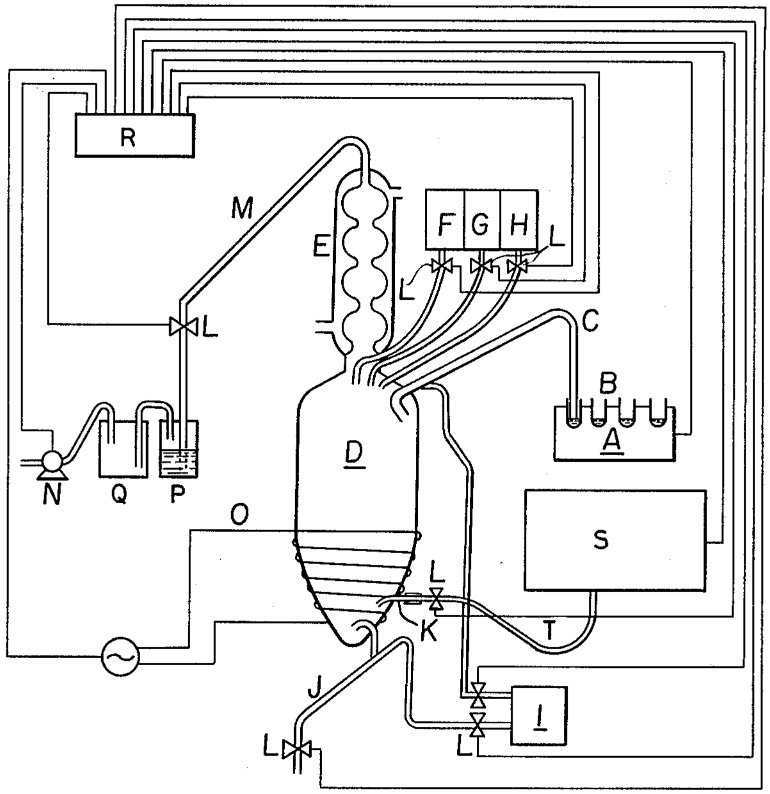

Another modified example of the present invention will be explained by referring to FIG. 3.

(A) is an automatic sample exchanger with which vessels containing samples (B) are successively exchanged one by one, and the samples (B) are transferred via the sample transfer tube (C) to the dissolving tank (D) in an instant by being suctioned by a reduced pressure produced by a vacuum pump (N) and a vacuum tank (Q). (D) is a dissolving tank made of quartz, the conical bottom of which is provided with a Nichrome wire that was wound directly on the outside wall to permit rapid heating of content. A condenser for cooling (E) is installed on the upper part of the dissolving tank (D) to return mist and vapor that may be produced from the dissolving solution in the tank and to maintain the volume of sample solution when the dissolution is over to the original volume of the dissolving solution. This permits the amount of the sample solution to be obtained from the amount of solution added. Since the constant volume is secured, an aliquot of the sample solution could be taken by mere suctioning, for example, for the atomic absorption spectrophotometry without previous cooling to room temperature and making up to a certain volume, say, by adding a necessary amount of water that is otherwise required in previous processes. Further, no loss of the dissolving solution occurs and this advantage leads to effective use of a small amount of the dissolving solution hence to decrease in the blank test values, which favors analysis of micro amounts of elements analysis. The outlet pipe for solution (J) is provided at the bottom of the dissolving tank (D) as shown in the figure to deliver the sample solution to the next step. Through the pipe (J) also air is blown with an air pump (I) into the tank while a sample is being dissolved for agitation and for avoiding bumping.

At the lower side wall the dissolving tank (D) is provided with a solution transfer tube (K) made of a quartz tube of about 1 mm in diameter, through which a sample solution prepared by heating in the tank (D) is transferred to an apparatus for atomic absorption analysis (S) via the solution suction tube (T) with the heater switched off and the electromagnetic cock (L) on the solution transfer tube (K) opened. If necessary, a required amount of an organic solvent, alcohol for example, is added from the apparatus for quantitatively adding organic solvents (F), agitated with blown air and then transferred to the apparatus for atomic absorption analysis (S) via the solution transfer tube (K). Since a required portion of the sample solution is transferred for analysis by suctioning to the atomic absorption analysis apparatus (S) and the remainder of the solution in the dissolving tank is discarded via the outlet for solution (J) immediately before the end of analysis, there will remain almost no appreciable amount of the solution in the solution transfer tube (K) and the solution suction tube (T) because the inner diameter of the tubes is as small as about 0.5mm. The solution transfer tube (K) is most suitably installed on the side wall at the lower part of the dissolving tank, considering blocking of the tube due to undissolved matter in samples and the operation to discard the remaining solution mentioned above.

The upper part of the dissolving tank (D) is fitted with conduits to an apparatus for quantitatively adding solvent (F) and apparatus for quantitatively adding dissolving solution (G) and (H), which are for use to add at a certain period of time, certain amounts of solvents and the dissolving solution. Any dissolving solution that has been used hitherto can be employed for the present purpose depending on the nature of samples. Among them, however, a mixture of concentrated hydrochloric acid and hydrogen peroxide (a 30% solution in water) that have been separately contained in the vessels (G) and (H) and is prepared by mixing them in the ratio of 1 : 1 directly in the dissolving tank (D) in the most effective for the dissolving reaction to proceed rapidly due to the effective action of chlorine in the nascent state on the samples. In a manual operation, however, it is rather difficult to secure the simultaneous addition of the two components to fully utilize the component in the nascent state for the dissolving reaction, while the automatic operation as is used in the present invention is extremely useful for the operation to dissolve samples. Gases that may be produced at the sample dissolution are expelled to outside the system with a vacuum pump via the exhaust pipe (M).

Each individual step of operation of the present invention is characterized by being under control of an automatic controlling device. In practice, a pin-board type sequence programmer, for example, could be used for the purpose of automatic control.

Using the device of this invention above, each 0.25g of chipped various iron and steel was automatically and successively dissolved and transferred through the solution transfer tube, and was analyzed for aluminum and calcium with the coupled atomic absorption analysis apparatus. The procedure required 5 minutes for a cycle of a sample.

In contrast to the previously used manual operation in the atomic absorption spectrophotometry, the present invention, in which an aliquot of a sample solution is directly delivered from a dissolving tank via a fine tube, provides an entirely new process for automatically dissolving solid samples for atomic absorption analysis where the dissolving tank for preparing sample solutions serves also as sample container and an aliquot is directly transferred for the analysis immediately after dissolution, and the process is also featured by a practical advantage with which the process can be followed automatically and continuously without inefficient operations such as cooling and quantitative volumetric adjustment.

What is claimed is:

1. A method for automatically dissolving solid analysis samples in powder form comprising the steps of providing a dissolving tank in which said powder samples are dissolved, providing a source of said powder samples externally of said tank, providing condenser means at the top of said tank, applying a vacuum to said tank through said condenser means to effect transfer of said powder samples from said source into said tank, adding a predetermined amount of dissolving solution to said tank, applying heat to said tank, dissolving said powder sample by application of said heat and said dissolving solution to said tank, withdrawing a predetermined amount of said dissolved sample solution from said tank and individually selectively controlling, by automatic control means, application of vacuum to said tank, addition of said dissolving solution, application of said heat to said tank, and withdrawal of said dissolved sample solution in order to effect automatic performance of said method.

2. A method according to claim 1, wherein application of said vacuum is effected rapidly.

3. Apparatus for automatically dissolving analysis samples in powder form comprising a dissolving tank having a bottom and a top, outlet means at said tank bottom, container means having therein said samples in powder form, means communicating said container means with said tank top to enable transfer of said powder samples into said tank, condenser means communicating with said tank top to effect condensation of vapor rising from said tank, means for applying heat to the vicinity of said tank bottom, means for introducing dissolving solution into said tank top, suction means for applying a vacuum to said tank top through said condenser means to draw powder samples from said container means into said tank, means for transferring through said outlet means dissolved samples to be analyzed, said samples having been dissolved in said tank by said applied heat and said dissolving solution, and means for automatically controlling operation of each of said outlet means, said heat applying means, said suction means and said means for introducing said dissolving solution.

4. Apparatus according to claim 1, wherein said outlet means include a pair of outlets extending from said tank bottom with one of said outlets being above the other.

5. Apparatus according to claim 4, wherein each of said outlets is connected to a different analysis system.

6. Apparatus according to claim 3, wherein said means communicating said container means with said tank top comprise a conduit extending into said tank top from said container means, said conduit having an outlet portion extending internally of said tank in a direction downwardly thereof and away from said condenser means.

7. Apparatus according to claim 3, wherein said suction means comprise a vacuum pump, conduit means in communication between said condenser means and said vacuum pump, an electromagnetic cock for opening and closing fluid flow through said conduit means, and means connecting said electromagnetic cock with said control means for controlling application of said vacuum to said tank top.

8. Apparatus according to claim 7, wherein said control means include means for effecting rapid opening of said electromagnetic cock.

* * * * *